(12) United States Patent
Kwon et al.

(10) Patent No.: US 9,786,930 B2
(45) Date of Patent: Oct. 10, 2017

(54) FUEL CELL SYSTEM AND METHOD FOR CONTROLLING THE SAME

(71) Applicant: Hyundai Motor Company, Seoul (KR)

(72) Inventors: Soon Woo Kwon, Yongin (KR); Joon Yong Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 109 days.

(21) Appl. No.: 14/523,899

(22) Filed: Oct. 26, 2014

(65) Prior Publication Data

US 2015/0364776 A1    Dec. 17, 2015

(30) Foreign Application Priority Data

Jun. 11, 2014    (KR) ........................ 10-2014-0070967

(51) Int. Cl.
| | |
|---|---|
| *H01M 8/04* | (2016.01) |
| *H01M 8/04007* | (2016.01) |
| *B60L 11/18* | (2006.01) |
| *H01M 8/04223* | (2016.01) |
| *H01M 8/0432* | (2016.01) |
| *H01M 8/04701* | (2016.01) |
| *H01M 8/04302* | (2016.01) |

(52) U.S. Cl.
CPC ......... *H01M 8/04067* (2013.01); *B60L 11/18* (2013.01); *H01M 8/0432* (2013.01); *H01M 8/04268* (2013.01); *H01M 8/04302* (2016.02); *H01M 8/04701* (2013.01); *H01M 2250/20* (2013.01); *Y02T 90/32* (2013.01)

(58) Field of Classification Search
USPC .................................................. 429/429, 434
See application file for complete search history.

(56) References Cited

U.S. PATENT DOCUMENTS

| | | | | |
|---|---|---|---|---|
| 5,877,600 | A * | 3/1999 | Sonntag ................. | B60L 11/02 180/65.31 |
| 6,520,273 | B1 * | 2/2003 | Ishikawa ............ | B60L 11/1881 429/415 |
| 9,034,532 | B2 * | 5/2015 | Sung ................ | H01M 8/04037 429/429 |
| 2012/0183814 | A1 | 7/2012 | Boegershausen et al. | |

FOREIGN PATENT DOCUMENTS

| | | |
|---|---|---|
| JP | 2004-247164 | 9/2004 |
| JP | 2006-344498 | 12/2006 |
| JP | 2007-214080 | 8/2007 |
| JP | 2011-089625 A | 5/2011 |
| KR | 10-2010-0076020 A | 7/2010 |

\* cited by examiner

*Primary Examiner* — Osei Amponsah
(74) *Attorney, Agent, or Firm* — Mintz Levin Cohn Ferris Glovsky and Popeo, P.C.; Peter F. Corless

(57) ABSTRACT

A fuel cell system and a method for controlling the same are provided. The method includes rapidly increasing an angular speed of a rotating magnetic field of an induction motor to maximize iron loss of the induction motor, thereby resulting in an increase in the temperature of a rise cell stack. The method further includes eliminating torque of a driving motor generated by an increase in the angular speed of the rotating magnetic field, using a torque eliminator. The torque eliminator includes a P-stage reducer or a hydraulic break.

4 Claims, 3 Drawing Sheets

FUEL CELL SYSTEM AND METHOD FOR CONTROLLING THE SAME

CROSS-REFERENCE(S) TO RELATED APPLICATION

The present application claims priority to Korean Patent Application Number 10-2014-0070967 filed on Jun. 11, 2014, which is incorporated herein in its entirety.

BACKGROUND

Field of the Invention

The present invention relates to a fuel cell system and a method for controlling the same, and more particularly to a fuel cell system and a method for controlling the same which rapidly increases a temperature of a fuel cell stack under cold start conditions.

Description of the Related Art

A fuel cell vehicle includes a fuel cell stack in which a plurality of fuel cells used as a driving power source are stacked, a fuel feeding system configured to feed hydrogen, that operates as a fuel, to the fuel cell stack, an air feeding system configured to feed air, which is used as an oxidizing agent in an electrochemical reaction in the fuel cell stack, and a heat-and-water management system configured to adjust a temperature of the fuel cell stack.

The fuel feeding system reduces a pressure of compressed hydrogen stored in a hydrogen tank and supplies the pressure-reduced hydrogen to a fuel electrode (anode) of the fuel cell stack. The air feeding system is also configured to operate a blower to supply suctioned air to an air electrode (cathode) of the fuel cell stack.

When hydrogen and oxygen are supplied to the fuel electrode and the air electrode of the fuel cell stack, respectively, hydrogen ions are produced from the fuel electrode through a catalytic reaction. The produced hydrogen ions move to an oxidation electrode (air electrode) through an electrolyte membrane, and electrochemical reactions occur among the hydrogen ions, electrons, and oxygen, thus producing energy. More specifically, an oxidation reaction occurs through an electrochemical oxidation reaction of hydrogen in the fuel electrode, and a reduction reaction occurs through an electrochemical reaction of oxygen in the air reaction. Further, produced electrons move, thus producing electricity and heat. During this process, vapor or water is produced through a chemical reaction where hydrogen and oxygen are combined.

A discharging device is installed to discharge byproducts such as heat, vapor and water, which are produced while the fuel cell stack is generating electric energy, and remnants, such as hydrogen and oxygen. Gases such as vapor, hydrogen, and oxygen are released via a ventilating pipe. A current command issued by a current command generator is output to a current controller (not shown). The current controller is configured to generate a d-axis voltage command and a q-axis voltage command and then generate three phases of voltage commands. Therefore, a motor may be controlled through pulse width modulation and the three-phase current control.

When a fuel cell vehicle stops, a portion of water produced during driving of the vehicle remains within the fuel cell stack. When the exterior temperature is substantially low (e.g., below a predetermined temperature) the remaining water typically freezes and may eventually become ice and disable the start of an engine. There are various reliable methods of enabling a cold start. One method includes quickly thawing cooling water using a heater and another method includes heating air using a heater installed on a pipeline of an air feeding system.

However installing a heater on a suction pipeline disposed between an air blower and a humidifier at the time of cold starting and heating a fuel cell stack by ventilating an enclosure which surrounds the fuel cell stack using hot air discharged from the fuel cell stack have some disadvantages. Some examples of disadvantages are an additional heater is necessary to heat the fuel cell stack and the fuel cell stack requires a structural change. In other words, the necessary changes complicate the arrangement and design of constituent parts and increase the manufacturing cost. Furthermore, heating the fuel cell stack to a desired level using the heater requires a substantial increase in time.

The foregoing is intended merely to aid in the understanding of the background of the present invention, and is not intended to mean that the present invention falls within the purview of the related art that is already known to those skilled in the art.

SUMMARY

An objective of the present invention provides a fuel cell system and a method for controlling the same which may rapidly increase a temperature of a fuel cell slack using an induction motor (when an induction motor is used as a driving motor).

According to an exemplary embodiment of the present invention, a method for controlling a fuel cell system, may include: rapidly increasing an angular speed of a rotating magnetic field of an induction motor configured to maximize iron loss of the induction motor, which may result in an increase in a temperature of a fuel cell stack; and eliminating a torque of a driving motor which may be generated by an increase in the angular speed of the rotating magnetic field using a torque eliminator. The torque eliminator may include at least one selected from the group consisting of a P-stage reducer and a hydraulic brake. The P-stage reducer denotes a reducer in a state that the reducer is engaged with a park gear (P gear).

The control method may further include: determining whether a speed change gear of a vehicle may be engaged with the P gear; and rapidly increasing the angular speed of the rotating magnetic field when the speed change gear of the vehicle is determined to be in the P gear. When the speed change gear is not engaged with the P gear, a gear change request signal may be output in order to shift the speed change gear to the P gear. When the speed change gear is shifted to the P gear in response to the gear change request signal, the angular speed of the rotating magnetic field may be increased. The control method may further include: determining whether a fuel cell vehicle is in a cold start environment, in which an external temperature of a fuel cell vehicle is equal to or less than a predetermined temperature. The increasing the angular speed of the rotating magnetic field of the driving motor may be performed when the fuel cell vehicle is determined to be in the cold start environment. The control method may further include: increasing a value of a current command of the motor to increase an induction current of the induction motor after increasing the angular speed of the rotating magnetic field.

According to one aspect of the present invention, a fuel cell system may include a fuel cell stack, an inverter configured to receive power from the fuel cell stack, an induction motor driven according to a signal output from the inverter, a controller which configured to rapidly increase an angular speed of a rotating magnetic field of the induction motor to maximize iron loss of the induction motor, which may result in an increase in a temperature of the fuel cell stack, and a torque eliminator configured to eliminate torque of the induction motor, which may be generated due to an increase in the angular speed of the rotating magnetic field.

According to another aspect of the present invention, it may be possible to boost electrochemical reactions within a fuel cell stack by reducing efficiency of an induction motor by increasing iron loss of the induction motor, which may result in a rapid increase in a temperature of a fuel cell stack. Additionally, it may be possible to stabilize operation of the induction motor by eliminating a torque of a motor generated due to an increase in waste heat generated from the induction motor.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Figure 1:
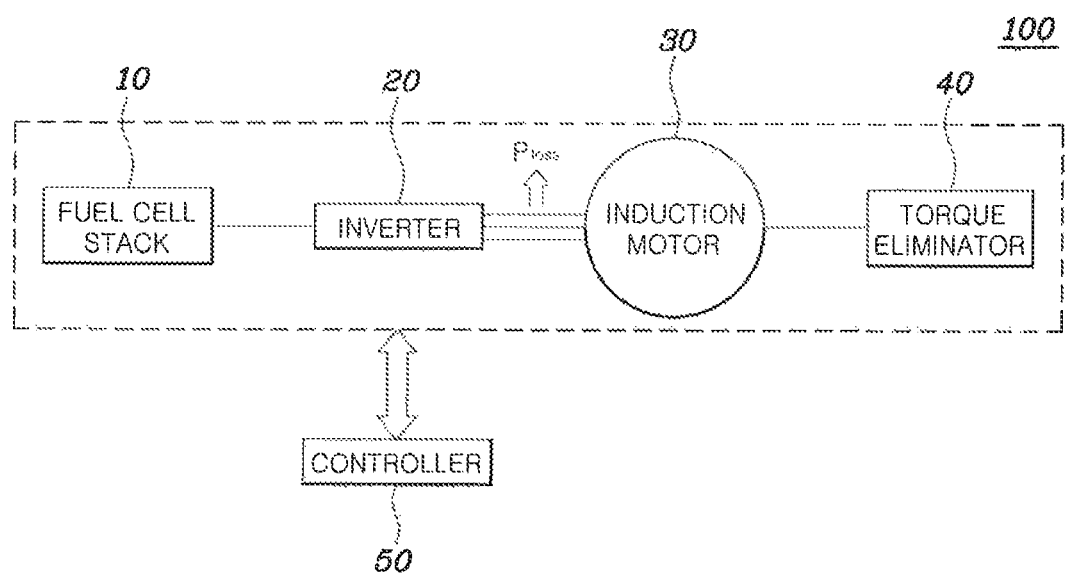
FIG. 1 is an exemplary block diagram schematically illustrating a fuel cell system according to one exemplary embodiment of the present invention.

The terminology used herein is for the purpose of describing particular embodiments only and is not intended to be limiting of the invention. As used herein, the singular forms "a", "an" and "the" are intended to include the plural forms as well unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Specific structural and functional descriptions of exemplary embodiments of the present invention disclosed herein are only for illustrative purposes of the exemplary embodiments of the present invention. The present invention may be embodied in many different forms without departing from the spirit and significant characteristics of the present invention. Therefore, the exemplary embodiments of the present invention are disclosed only for illustrative purposes and should not be construed as limiting the present invention.

Reference will now be made in detail to various exemplary embodiments of the present invention, specific examples of which are illustrated in the accompanying drawings and described below, since the exemplary embodiments of the present invention may be variously modified in many different forms. While the present invention will be described in conjunction with exemplary embodiments thereof, it is to be understood that the present description is not intended to limit the present invention to those exemplary embodiments. On the contrary, the present invention is intended to cover not only the exemplary embodiments, but also various alternatives, modifications, equivalents.

It will be understood that, although the terms "first" "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it may be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinbelow, exemplary embodiments of the present invention will be described in detail with reference to the accompanying drawings. Throughout the drawings, the same reference numerals will refer to the same or like parts.

FIG. 1 is an exemplary block diagram schematically illustrating a fuel cell system according to one exemplary embodiment of the present invention. The fuel cell system according to one embodiment of the present invention may include a fuel cell stack 10, an inverter 20 configured to receive power from the fuel cell stack 10, an induction motor 30 driven by a signal output from the inverter 20, a torque eliminator 40 configured to eliminate torque of the induction motor 30 which may be generated due to an increase in an angular speed of a rotating magnetic field of the induction motor 30, and a controller 50 configured to rapidly increase the angular speed of the rotating magnetic field of the induction motor 30 to maximize iron loss of the induction motor 30, which may result in an increase in the temperature of the fuel cell stack 10.

The induction motor 30 may be one selected from the group consisting of: a traction motor, an air blower motor, and a three-phase alternating current (AC) motor. A stator of the induction motor 30 may include three coils, which may receive current command signals, modified from a d-axis current command and a q-axis current command which may have an about 90 degree phase difference from each other, to adjust the rotation speed and torque of the induction motor 30. Under a normal operation condition when the fuel cell system is not in a cold start environment, the induction motor 30 may be configured to operate with maximum efficiency. The induction motor 30 may be used as a load to promptly increase an operation temperature of the fuel cell stack 10. In other words, when loss from the induction motor 30 increases, power obtained from the fuel cell stack 10 may be distributed. A function of the induction motor 30 may be to convert electric energy into mechanical energy for rotation. The technology of the present invention may increase a proportion of the energy consumed as heat. The inverter 20 may include a plurality of semiconductor switching devices such as IGBTs (Insulated Gate Bipolar Transistors) and a plurality of diodes configured to convert direct current (DC) output from the fuel cell stack to alternating current (AC) used by the coils of the stator.

Figure 3:
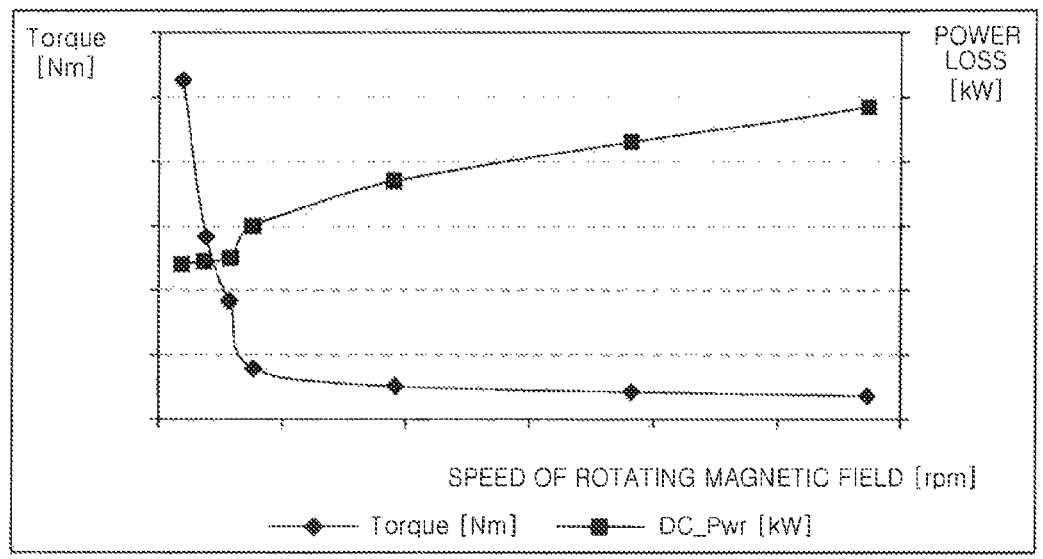
FIG. 3 is an exemplary graph illustrating an increase in angular speed of a rotating magnetic field, and torque and power loss according to the increase of the angular speed according to one exemplary embodiment of the present invention.

The controller 50 may be configured to rapidly increase the angular speed of the rotating magnetic field of the induction motor 30 to maximize iron loss (hysteresis loss) of the induction motor 30. FIG. 3 is an exemplary graph illustrating increases in an angular speed of a rotating magnetic field and changes in generated torque and power loss according to the angular speeds. As illustrated in FIG. 3, as the angular speed of the rotating magnetic field increases, iron loss of the induction motor 30 increases and the torque of the induction motor 30 decreases. This may be limited to when the induction motor is stopped and a predetermined torque command is applied. In other words, the speed of the rotating magnetic field, the generated torque, and the iron loss of the induction motor 30 are related to each other. Furthermore, the iron loss of the induction motor 30 is proportional to wasted heat from the motor. The iron loss may be a loss attributable to the induction motor 30 and it may be hysteresis loss. Hysteresis loss is energy consumed as frictional heat while dipole molecules are moving due to change in magnetizing force. In other words, when the angular speed of the rotating magnetic field is increased, to increase the magnetizing force, the iron loss also increases. Accordingly, the controller 50 may be configured to increase the angular speed of the rotating magnetic field to increase the iron loss of the induction motor 30. The torque, which may be generated due to an increase in the speed of the rotating magnetic field, may be eliminated by the torque eliminator 40. The torque eliminator 40 may be a P-stage reducer or a hydraulic brake, but it is not limited thereto.

When the torque eliminator 40 is the P-stage reducer, the controller 50 may be configured to determine whether a speed change gear engaged to a park gear (P gear). In response to determining the speed change gear has not engaged to the P gear, the controller 50 may be configured to increase the speed of the rotating magnetic field after shifting the speed change gear to engage the P gear. Further, the controller 50 may be configured to determine whether a fuel cell vehicle may be in a cold start environment in which a current external temperature of the fuel cell vehicle is less than a predetermined temperature. When the condition is determined to be a cold start environment it may not be necessary to increase the iron loss of the induction motor 30.

Figure 2:
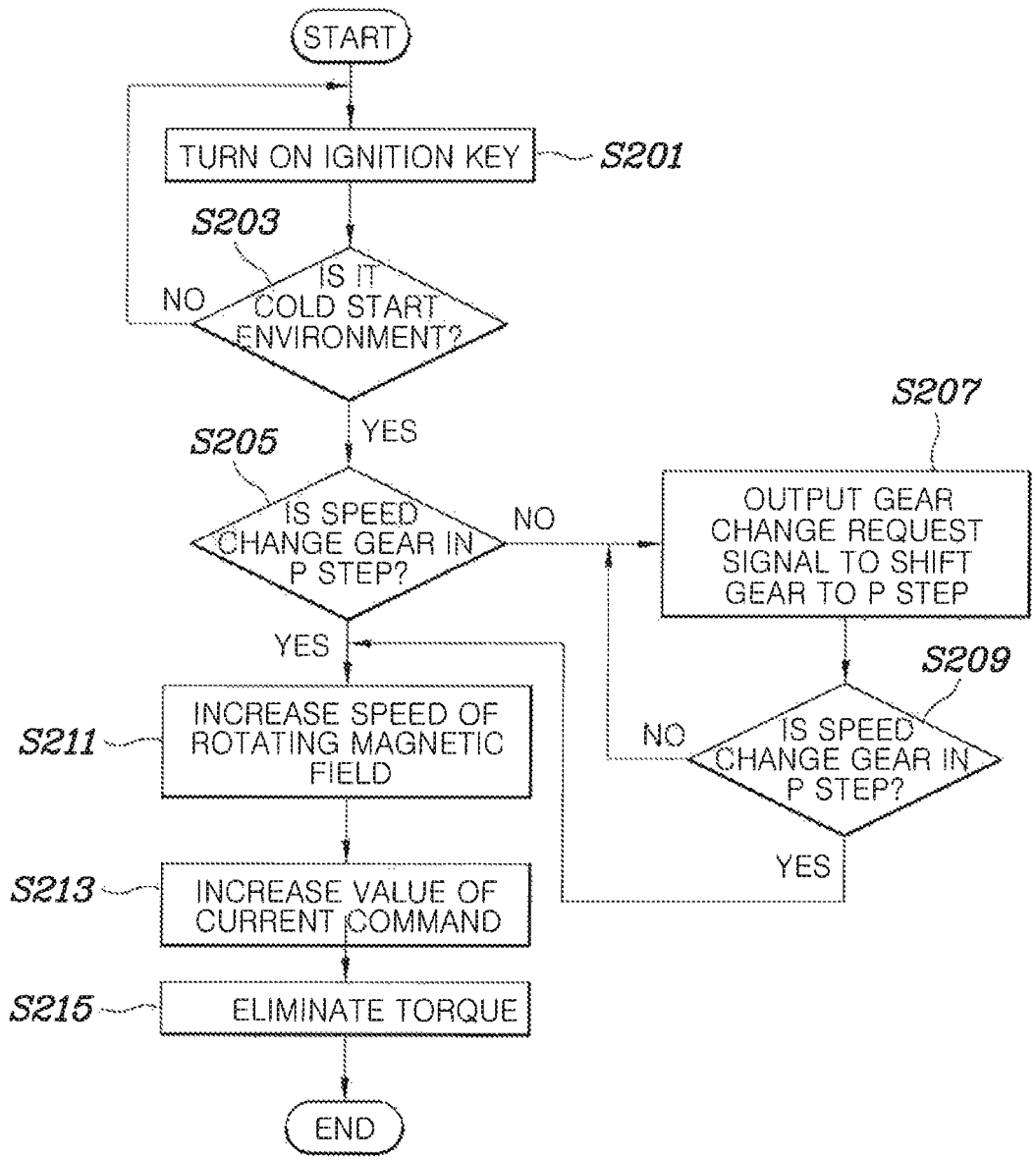
FIG. 2 is an exemplary flow chart illustrating a control method for the fuel cell system according to one exemplary embodiment of the present invention.

FIG. 2 is an exemplary flow chart illustrating a method for controlling a fuel cell system according to one exemplary embodiment of the present invention. The method for controlling a fuel cell system may include: determining, by a controller, whether a fuel cell vehicle is in a cold start environment (Step S203) when an ignition key is turned on (Step S201). When in a cold start environment, the P-stage reducer, which may operate as the torque eliminator 40, may be configured to determine whether a speed change gear is currently engaged to the P gear (Step S205). The torque eliminator 40 may be executed by the controller 50. When the speed change gear is not engaged to the P gear, the controller 50 may be configured to output a gear change request signal (Step S207) and determines whether the speed change gear is shifted to the P gear (Step S209). The controller 50 may be configured to increase the angular speed of the rotating magnetic field of the induction motor 30 when the speed change gear stays engaged to or shifts to the P gear (Step S211). When the increased speed of the rotating magnetic field reaches a predetermined speed, the controller 50 may be configured to increase the value of the current command to be output to the induction motor 30, to increase the induction current of the induction motor 30 at a substantially constant speed of the rotating magnetic field.

Figure 4:
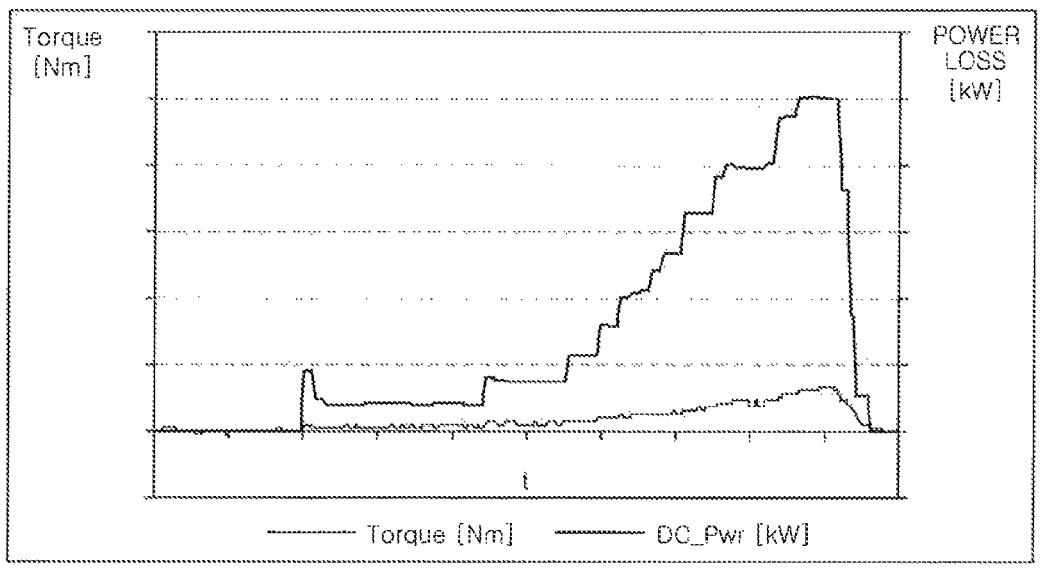
FIG. 4 is an exemplary graph illustrating changes in power loss according to current command values at a constant angular speed of a rotating magnetic field according to one exemplary embodiment of the present invention.

FIG. 4 is an exemplary graph illustrating fluctuations in iron loss according to changes in current commands at a constant speed of a rotating magnetic field. As illustrated in FIG. 4, the value of a torque command and the iron loss of the induction motor 30 both increase when the value of a current command increases when an angular speed of a rotating magnetic field is about 30000 rpm.

Furthermore, the controller 50 may be configured to instruct the torque eliminator 40 to eliminate the torque generated by an increase in the speed of the rotating magnetic field. A relationship between the generated torque and wasted heat from the induction motor 30 may exist. Furthermore, it may be possible to increase the load of the fuel cell stack 10 by eliminating the generated torque using the torque eliminator. Accordingly, it may be possible to reduce a time required to cold start a fuel cell vehicle.

Although the present invention has been described with reference to exemplary embodiments illustrated in the drawings for illustrative purposes, those skilled in the art will appreciate that various modifications and equivalent embodiments are possible, without departing from the scope and spirit of the invention. Accordingly, the substantial technical protection scope of the present invention will be defined by the appended claims.

What is claimed is:

1. A method for controlling an operation of a fuel cell system, comprising:
   increasing, by a controller, an angular speed of a rotating magnetic field of an induction motor, which is driven by a signal output from an inverter configures to receive power from a fuel cell stack, to maximize iron loss of the induction motor, thereby and increase a temperature of a fuel cell stack;
   eliminating, by the controller, torque, generated due to an increase in the angular speed, of a driving motor using a torque eliminator, wherein the torque eliminator includes a park-stage reducer or hydraulic brake;
   increasing, by the controller, a value of a current command of the motor in order to increase an induction current of the induction motor after increasing the angular speed of the rotating magnetic field;
   outputting, by the controller, a gear change request signal so as to shift the speed change gear to the P gear when the speed change gear is not engaged to the P gear; and
   increasing, by the controller, the angular speed of the rotating magnetic field when the speed change gear is shifted to the P gear in response to the gear change request signal.

2. The method of claim 1, further comprising:
   determining, by the controller, whether a fuel cell vehicle is in a cold start environment, wherein an external temperature of a fuel cell vehicle is equal to or less than a predetermined temperature; and
   increasing, by the controller, the angular speed in response to determining that the fuel cell vehicle is in the cold start environment.

3. A fuel cell system comprising:
   a fuel cell stack;
   an inverter configured to receive power from the fuel cell stack;
   an induction motor driven by a signal output from the inverter;
   a controller configured to:
      rapidly increase an angular speed of a rotating magnetic field of the induction motor to maximize iron loss of the induction motor, and to increase a temperature of the fuel cell stack;
      eliminate torque of the induction motor which is increased due to an increase in the angular speed of the rotating magnetic field, using a torque eliminator, wherein the torque eliminator includes a park-stage reducer or a hydraulic break;
      increase a value of a current command of the motor to increase an induction current of the induction motor after increasing the angular speed of the rotating magnetic field;
      output a gear change request to shift the speed change gear to engage the P gear when the speed change gear is not engaged to the P gear; and
      increase the angular speed of the rotating magnetic field when the speed change gear is shifted to the P gear in response to the gear change request.

4. The fuel cell system of claim 3, wherein the controller is further configured to:
   determine whether a fuel cell vehicle is in a cold start environment wherein an external temperature of a fuel cell vehicle is equal to or less than a predetermined temperature; and
   increase the angular speed in response to determining that the fuel cell vehicle is in a cold start environment.

* * * * *